(12) United States Patent
Wang et al.

(10) Patent No.: US 9,767,558 B2
(45) Date of Patent: Sep. 19, 2017

(54) METHOD AND APPARATUS FOR MEASURING ROTATION PARAMETERS OF A SPINE ON MEDICAL IMAGES

(71) Applicant: General Electric Company, Schenectady, NY (US)

(72) Inventors: Wei Wang, Beijing (CN); Yang Gao, Beijing (CN); Wei Wei, Beijing (CN); Feifei Zhou, Beijing (CN); Nan Cao, Beijing (CN); Qingyu Ma, Beijing (CN); Yong Tao, Beijing (CN); Xueming Zeng, Beijing (CN)

(73) Assignee: General Electric Company, Schenectady, NY (US)

( * ) Notice: Subject to any disclaimer, the term of this patent is extended or adjusted under 35 U.S.C. 154(b) by 109 days.

(21) Appl. No.: 14/958,380

(22) Filed: Dec. 3, 2015

(65) Prior Publication Data

US 2016/0163050 A1   Jun. 9, 2016

(30) Foreign Application Priority Data

Dec. 5, 2014   (CN) .......................... 2014 1 0742326

(51) Int. Cl.
*G06T 7/00* (2017.01)
*G06T 11/60* (2006.01)
*G06T 3/60* (2006.01)

(52) U.S. Cl.
CPC ............ *G06T 7/0014* (2013.01); *G06T 3/602* (2013.01); *G06T 11/60* (2013.01); *G06T 2207/10116* (2013.01); *G06T 2207/30012* (2013.01)

(58) Field of Classification Search
CPC ....... G06T 3/602; G06T 7/0014; G06T 11/60; G06T 2207/10116; G06T 2207/30012
See application file for complete search history.

(56) References Cited

U.S. PATENT DOCUMENTS

2002/0048394 A1*  4/2002  Nagata ..................... G06T 7/60
                                                     382/132
2002/0057828 A1*  5/2002  Oosawa .................... G06T 7/60
                                                     382/132

(Continued)

OTHER PUBLICATIONS

Gill et al. "Biomechanically constrained groupwise US to CT registration of the lumbar spine." Medical image computing and computer-assisted intervention—MICCAI 2009 (2009): 803-810.*

(Continued)

*Primary Examiner* — Katrina Fujita

(57) ABSTRACT

The present invention relates to a method and apparatus for measuring rotation parameters of a spine on medical images. The method comprises: selecting a reference image and a movement image from the medical images; determining a lower spine image and an upper spine image in the reference image, and determining a lower spine image and an upper spine image in the movement image; registering the lower spine image in the movement image with the lower spine image in the reference image; correcting the upper spine image in the movement image according to output parameters of registration of the lower spine images; superposing the upper spine image in the reference image with the corrected upper spine image in the movement image to obtain a superposed image; and calculating to obtain the rotation parameters according to a position difference between the upper spine image in the reference image and the upper spine image in the movement image on the superposed image.

14 Claims, 4 Drawing Sheets

(56) References Cited

U.S. PATENT DOCUMENTS

| | | | | |
|---|---|---|---|---|
| 2006/0002632 | A1* | 1/2006 | Fu | G06T 7/344 382/294 |
| 2006/0120583 | A1* | 6/2006 | Dewaele | G06T 3/0068 382/128 |
| 2007/0171225 | A1* | 7/2007 | Haex | G06T 7/0012 345/473 |
| 2007/0242869 | A1* | 10/2007 | Luo | G06K 9/00 382/132 |
| 2008/0137928 | A1* | 6/2008 | Shen | G06T 7/38 382/131 |
| 2009/0226055 | A1* | 9/2009 | Dankowicz | G06T 17/00 382/128 |
| 2009/0285466 | A1* | 11/2009 | Hipp | G06T 7/0014 382/131 |
| 2011/0021914 | A1* | 1/2011 | Zheng | A61B 5/103 600/443 |
| 2011/0064291 | A1* | 3/2011 | Kelm | G06T 7/0087 382/131 |
| 2013/0173240 | A1* | 7/2013 | Koell | G06F 17/5009 703/2 |
| 2014/0323845 | A1* | 10/2014 | Forsberg | A61B 5/4561 600/407 |
| 2015/0287184 | A1* | 10/2015 | Parent | G06F 19/3437 382/128 |

OTHER PUBLICATIONS

McCane et al. "Calculating the 2D motion of lumbar vertebrae using splines." Journal of biomechanics 39.14 (2006): 2703-2708.*

Rasoulian et al. "Feature- based multibody rigid registration of CT and ultrasound images of lumbar spine." Medical physics 39.6 (2012): 3154-3166.*

Frobin et al. "Precision measurement of segmental motion from flexion-extension radiographs of the lumbar spine." Clinical Biomechanics 11.8 (1996): 457-465.*

Commowick et al. "Automated diffeomorphic registration of anatomical structures with rigid parts: Application to dynamic cervical MRI." Medical Image Computing and Computer-Assisted Intervention—MICCAI 2012 (2012): 163-170.*

Forsberg et al. "Fully automatic measurements of axial vertebral rotation for assessment of spinal deformity in idiopathic scoliosis." Physics in medicine and biology 58.6 (2013): 1775-1787.*

* cited by examiner

METHOD AND APPARATUS FOR MEASURING ROTATION PARAMETERS OF A SPINE ON MEDICAL IMAGES

CROSS-REFERENCE TO RELATED APPLICATIONS

This application claims priority under 35 U.S.C. §119 from Chinese Patent Application No. 201410742326.1, filed on Dec. 5, 2014, the entirety of which is incorporated herein by reference.

BACKGROUND

The present invention relates to a method and apparatus for measuring parameters, and particularly to a method and apparatus for measuring rotation parameters of a spine on medical images.

When a diagnosis is performed for spondylopathy, a spine may be imaged (e.g., imaged by an X-ray) for multiple times during the movement of the patient's spine to obtain multiple images, and assistant information is then provided for the doctor by measuring rotation parameters of the spine on these images.

The so-called rotation parameters may refer to parameters related to relative rotation between two segments of vertebras, e.g., a rotation center and a relative rotation angle between the two segments of vertebras.

When the rotation centers between the same two segments of vertebras on the multiple images are connected together, a rotation center trajectory of these two segments of vertebras may also be obtained.

However, the prior art cannot rapidly and precisely measure the rotation parameters of the spine on the medical images.

SUMMARY

One embodiment of the present invention provides a method for measuring rotation parameters of a spine on medical images, comprising: selecting a reference image and a movement image from the medical images; determining a lower spine image and an upper spine image in the reference image and determining a lower spine image and an upper spine image in the movement image; registering the lower spine image in the movement image with the lower spine image in the reference image; correcting the upper spine image in the movement image according to output parameters of registration of the lower spine images; superposing the upper spine image in the reference image with the corrected upper spine image in the movement image to obtain a superposed image; and calculating to obtain the rotation parameters according to a position difference between the upper spine image in the reference image and the upper spine image in the movement image on the superposed image.

Another embodiment of the present invention provides an apparatus for measuring rotation parameters of a spine on medical images, comprising: an image selecting module for selecting a reference image and a movement image from the medical images; an upper and lower spine image selecting module for determining a lower spine image and an upper spine image in the reference image and determining the lower spine image and the upper spine image in the movement image; a lower spine image registering module for registering the lower spine image in the movement image with the lower spine image in the reference image; an upper spine image correcting module for correcting the upper spine image in the movement image according to output parameters of registration of the lower spine images; a superposed image generating module for superposing the upper spine image in the reference image with the corrected upper spine image in the movement image to obtain a superposed image; and a rotation parameter calculating module for calculating to obtain the rotation parameters according to a position difference between the upper spine image in the reference image and the upper spine image in the movement image on the superposed image.

BRIEF DESCRIPTION OF THE DRAWINGS

The present invention can be better understood in light of the following description of embodiments of the present invention with reference to the accompanying drawings, in which.

DETAILED DESCRIPTION

Figure 1:
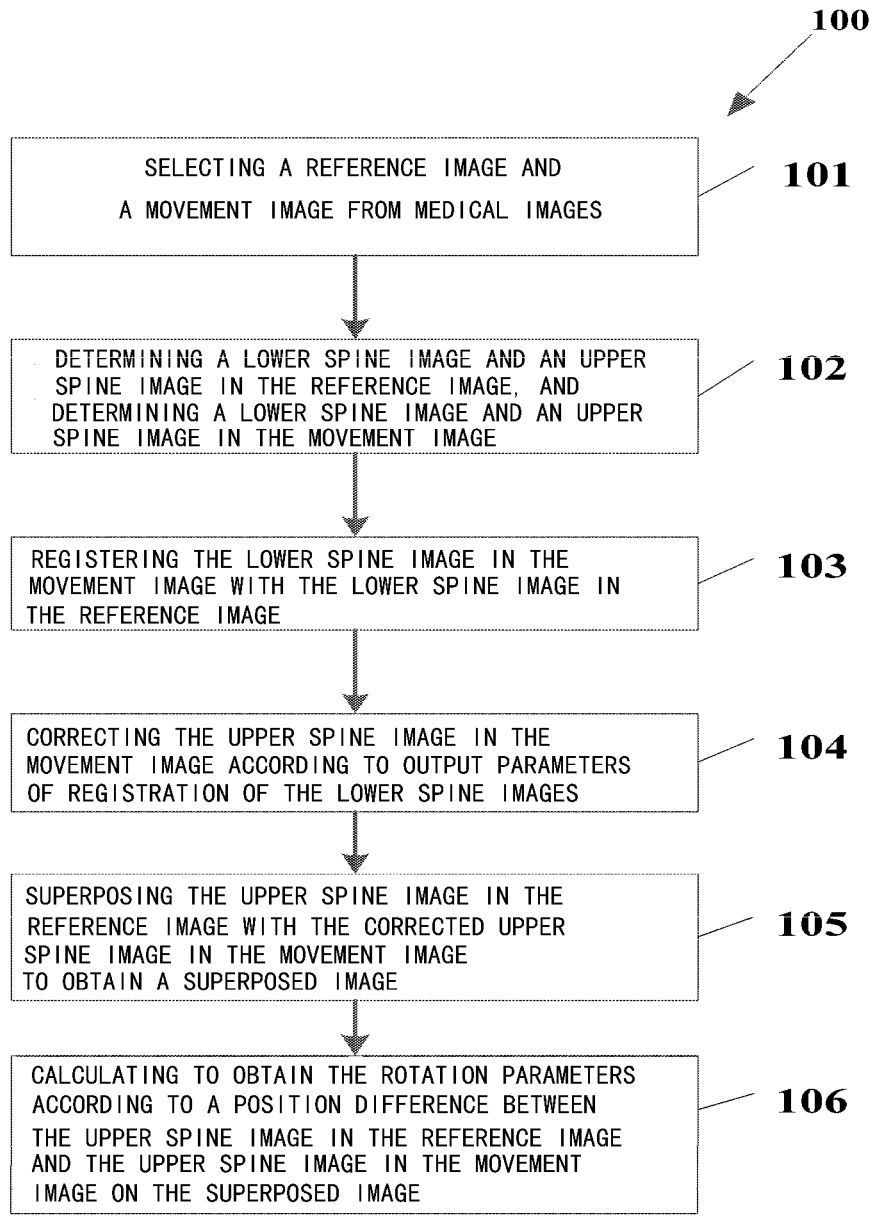
FIG. 1 is a flow schematic diagram illustrating one embodiment of a method for measuring rotation parameters of a spine on medical images according to the present invention.

Hereafter, a detailed description will be given for preferred embodiments of the present invention. It should be pointed out that in the detailed description of the embodiments, for simplicity and conciseness, it is impossible for the Description to describe all the features of the practical embodiments in details. It should be understood that in the process of a practical implementation of any embodiment, just as in the process of an engineering project or a designing project, in order to achieve a specific goal of the developer and in order to satisfy some system-related or business-related constraints, a variety of decisions will usually be made, which will also be varied from one embodiment to another. In addition, it can also be understood that although the effort made in such developing process may be complex and time-consuming, some variations such as design, manufacture and production on the basis of the technical contents disclosed in the disclosure are just customary technical apparatus in the art for those of ordinary skilled in the art relating to the contents disclosed in the present invention, which should not be regarded as insufficient disclosure of the present invention.

Unless defined otherwise, all the technical or scientific terms used in the Claims and the Description should have the same meanings as commonly understood by one of ordinary skilled in the art to which the present invention belongs. The terms "first", "second" and the like in the Description and the Claims of the present application for invention do not mean any sequential order, number or importance, but are only used for distinguishing different components. The terms "a", "an" and the like do not denote a limitation of quantity, but denote the existence of at least one. The terms "comprises", "comprising", "includes", "including" and the like mean that the element or object in front of the "comprises", "comprising", "includes" and "including" encompasses the elements or objects and their equivalents illustrated following the "comprises", "comprising", "includes" and "including", but do not exclude other elements or objects. The term "coupled", "connected" or the like is not limited to being connected physically or mechanically, nor limited to being connected directly or indirectly.

In order to make the purpose, the technical solutions and the advantages of the invention more apparent, the technical solutions of the present invention will be set forth clearly and fully in the following by combining with specific embodiments of the invention and the corresponding accompanying drawings. Obviously, the described embodiments are merely part—not all—of the embodiments in the present invention. In view of the embodiments in the present invention, other embodiments made by one of ordinary skilled in the art without inventive work all fall within the scope of protection of the invention.

By measuring rotation parameters of a spine on medical images of vertebras, the doctor may be assisted in judging spine lesion. The embodiments of the present invention are intended to provide a method and apparatus capable of automatically and precisely measuring the rotation parameters of the spine.

With reference to FIG. 1, FIG. 1 is a flow schematic diagram illustrating one embodiment of a method 100 for measuring rotation parameters of a spine on medical images according to the present invention. The method 100 may include the following steps 101-106.

As shown in FIG. 1, in step 101, a reference image and a movement image are selected from the medical images.

During the movement of the patient's spine, the spine may be imaged (e.g., imaged by an X-ray) for multiple times to obtain multiple images. In these multiple images, one image (e.g., the image obtained by the first-time imaging) may be selected as the reference image. Afterwards, an image is selected from the remaining images as the movement image that is desired to be compared with the reference image.

In step 102, a lower spine image and an upper spine image are respectively determined in the reference image and the movement image.

Figure 2:
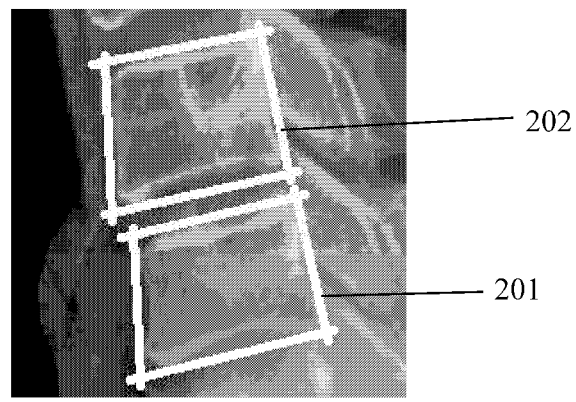
FIG. 2 is a schematic diagram illustrating a lower spine image and an upper spine image on a reference image.
Figure 3:
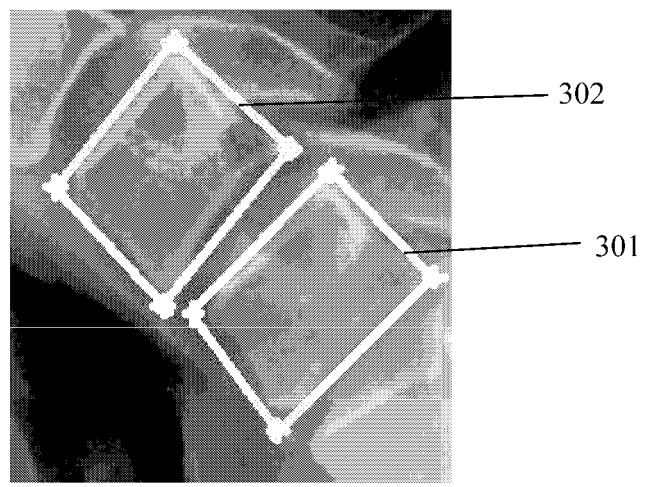
FIG. 3 is a schematic diagram illustrating a lower spine image and an upper spine image on a movement image.

For example, when the rotation parameters between the fourth segment of vertebra (C4) and the fifth segment of vertebra (C5) need to be measured, a region at which the fourth segment of vertebra and the fifth segment of vertebra are located may be firstly determined on the reference image, in which the image within the region at which the fourth segment of vertebra is located is just the upper spine image on the reference image and the image within the region at which the fifth segment of vertebra is located is just the lower spine image on the reference image. Likewise, a region at which the fourth segment of vertebra and the fifth segment of vertebra are located may be determined on the movement image, in which the image within the region at which the fourth segment of vertebra is located is just the upper spine image on the movement image and the image within the region at which the fifth segment of vertebra is located is just the lower spine image on the movement image. FIG. 2 is a schematic diagram illustrating the lower spine image and the upper spine image on the reference image, in which 201 is the selected lower spine image and 202 is the selected upper spine image. FIG. 3 is a schematic diagram illustrating the lower spine image and the upper spine image on the movement image, in which 301 is the selected lower spine image and 302 is the selected upper spine image.

In one embodiment of the present invention, the region of each segment of vertebra on the images may be in square shape, and the position of this region on the images may be determined by selecting the positions of four points of the square.

In one embodiment of the present invention, the lower spine image and the upper spine image may be manually determined, or may be automatically recognized by an image recognition method.

In step 103, the lower spine image in the movement image is registered with the lower spine image in the reference image.

The so-called registering or registration means that after the lower spine image in the movement image and/or the lower spine image in the reference image are properly transformed, the contents of the images can be overlapped with each other.

In one embodiment of the present invention, a rigid transform may be performed on the lower spine image in the movement image so as to perform the registration operation.

Figure 4:
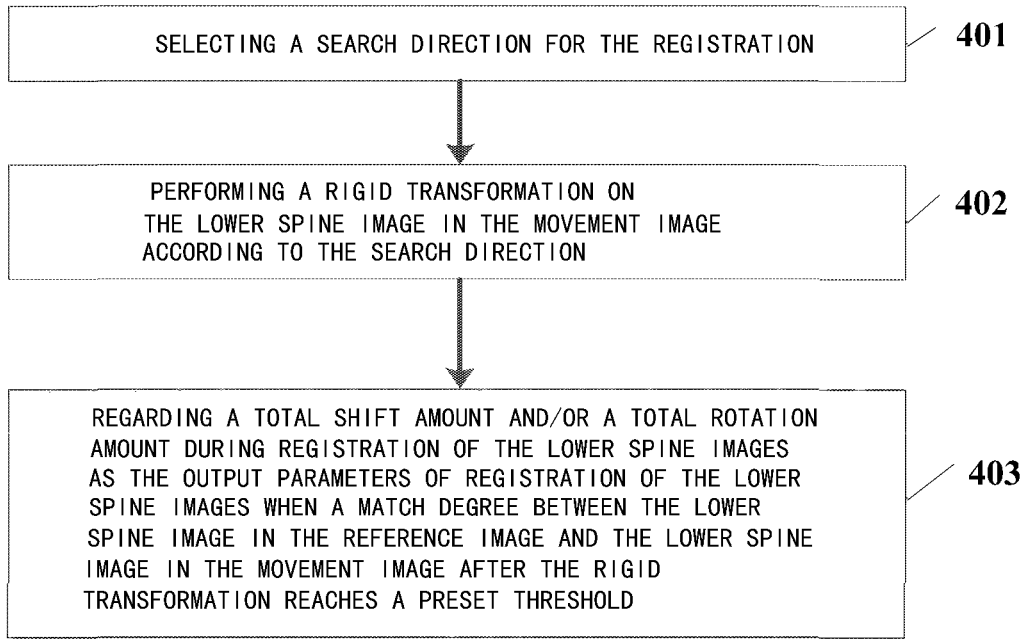
FIG. 4 is a flow schematic diagram illustrating one embodiment of the step of registering the lower spine images in the method according to the present invention.

With reference to FIG. 4, FIG. 4 is a flow schematic diagram illustrating one embodiment of the step of registering the lower spine images in the method according to the present invention. In one embodiment of the present invention, step 103 may include the following sub-steps 401-403 as shown in FIG. 4.

In sub-step 401, a search direction for registration is selected.

In one embodiment of the present invention, an optimized direction may be selected as the search direction for registering the lower spine images by Powell algorithm.

In sub-step 402, the rigid transform is performed on the lower spine image in the movement image according to the direction of rigid change.

Rotation and/or shift transform may be performed on the lower spine image in the movement image according to the optimized search direction obtained in step 401, and an interpolation operation may be performed on pixel points in the image.

In one embodiment of the present invention, the interpolation may be performed by a bilinear algorithm.

In sub-step 403, a total shift amount and/or a total rotation amount during the registration of the lower spine images is regarded as output parameters of registration of the lower spine images when a match degree between the lower spine image in the reference image and the lower spine image in the movement image after the rigid transform reaches a preset threshold.

When a round of rigid transform and interpolation are completed, an overlap degree may be judged between the lower spine image in the movement image after the rigid transform and the lower spine image in the reference image. When the overlap degree reaches a preset threshold, the rigid transform may be stopped and the total rotation amount and/or the total shift amount generated by performing the rigid transform on the lower spine image may be regarded as the output parameters of step 103.

In step 104, the upper spine image in the movement image is corrected according to the output parameters of registration of the lower spine images.

In one embodiment of the present invention, the rigid transform may be performed on the upper spine image in the movement image by the total rotation amount and/or the total shift amount outputted by step 103, such that the upper spine image in the movement image is corrected.

In another embodiment of the present invention, the rigid transform may be performed on the whole movement image by the total rotation amount and/or the total shift amount outputted by step 103.

In step 105, the upper spine image in the reference image is superposed with the corrected upper spine image in the movement image to obtain a superposed image.

In one embodiment of the present invention, the upper spine image in the reference image may be superposed with the corrected upper spine image in the movement image to obtain the superposed image.

In another embodiment of the present invention, the whole reference image may be superposed with the corrected whole movement image to obtain the superposed image.

In step 106, the rotation parameters are obtained by calculating according to a position difference between the upper spine image in the reference image and the upper spine image in the movement image on the superposed image.

Figure 5:
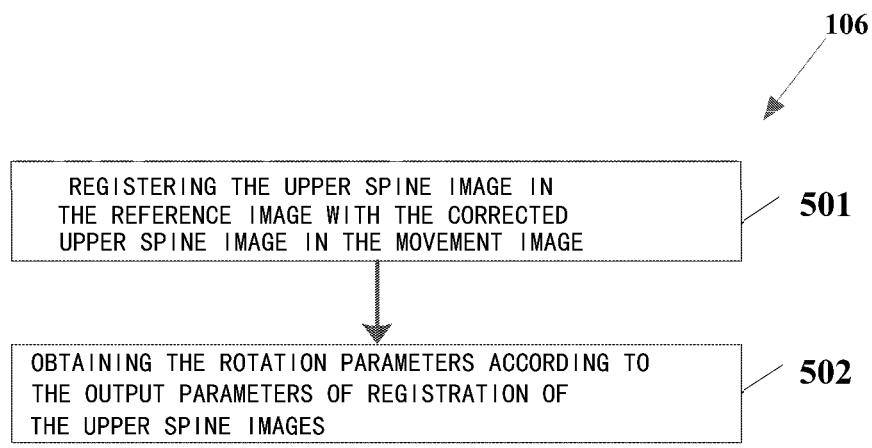
FIG. 5 is a flow schematic diagram illustrating one embodiment of the step of calculating the rotation parameters in the method according to the present invention.

With reference to FIG. 5, FIG. 5 is a flow schematic diagram illustrating one embodiment of the step of calculating the rotation parameters in the method according to the present invention. In one embodiment of the present invention, step 106 may further include the following sub-steps 501-502 as shown in FIG. 5.

In sub-step 501, the upper spine image in the reference image is registered with the corrected upper spine image in the movement image.

In one embodiment of the present invention, the upper spine image in the movement image corrected by step 104 may be registered with the upper spine image in the reference image by the same method as step 103. Specifically, the method may include the following sub-steps:

1) A search direction for registration is selected. In one embodiment of the present invention, an optimized direction may be selected as the search direction for registration by the Powell algorithm.

2) The rigid transform is performed on the upper spine image in the movement image according to the direction of rigid change.

A rotation and/or shift transform may be performed on the upper spine image in the movement image corrected by step 104 according to the optimized search direction obtained in step 401, and an interpolation operation may be performed on the pixel points in the image.

In one embodiment of the present invention, the interpolation may be performed by the bilinear algorithm.

When a round of rigid transform and interpolation are completed, an overlap degree may be judged between the upper spine image in the movement image after the rigid transform and the upper spine image in the reference image. When the overlap degree reaches a preset threshold, the rigid transform may be stopped and the total rotation amount and/or the total shift amount generated by performing the rigid transform on the upper spine image may be regarded as the output parameters of step 106.

In sub-step 502, the rotation parameters are obtained according to the output parameters of registration of the upper spine image.

In one embodiment of the present invention, the total rotation amount outputted by step 106 may be regarded as a rotation angle in the rotation parameters to be finally obtained by the method of the present invention.

Figure 6:
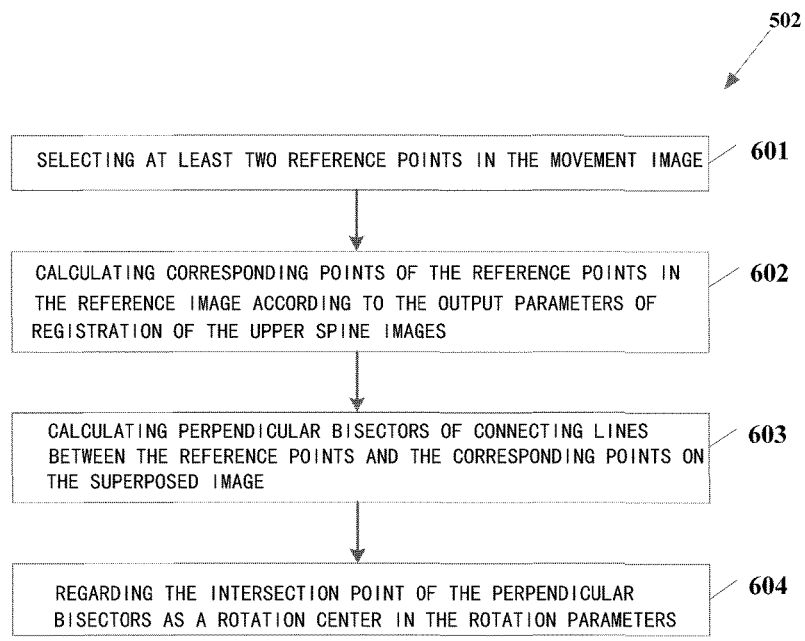
FIG. 6 is a flow schematic diagram illustrating one embodiment of calculating a rotation center in the rotation parameters in the method according to the present invention.

In one embodiment of the present invention, sub-step 502 may further calculate a rotation center in the rotation parameters by the following sub-steps 601-604. With reference to FIG. 6, FIG. 6 is a flow schematic diagram illustrating one embodiment of calculating the rotation center in the rotation parameters in the method of the present invention.

In sub-step 601, at least two reference points are selected in the movement image.

In one embodiment of the present invention, two arbitrary points may be selected in the movement image as the reference points.

In sub-step 602, corresponding points of the reference points in the reference image are calculated according to the output parameters of registration of the upper spine images.

In one embodiment of the present invention, a coordinate of the corresponding point of each reference point on the reference image may be calculated by the total rotation amount and/or the total shift amount outputted by registration of the upper spine images.

In sub-step 603, perpendicular bisectors of connecting lines between the reference points and the corresponding points are calculated on the superposed image.

On the superposed image, each reference point in sub-step 601 and the corresponding point to the reference point may be connected together by a straight line segment so as to obtain the perpendicular bisector of each straight line segment.

In sub-step 404, an intersection point of the perpendicular bisectors is regarded as the rotation center in the rotation parameters.

An intersection point of multiple perpendicular bisectors obtained in step 603 may be regarded as the rotation center.

It should be pointed out that the measurement of the rotation parameters between one movement image and the reference image may be completed by implementing the above steps 101-106 once. For other movement images acquired during one spine movement of the patient, the rotation parameters of these movement images relative to the reference image may also be obtained by measuring through a method similar to the above steps 101-106, such that the rotation center point of each movement image relative to the reference image may be connected together to obtain a trajectory of the rotation center points.

So far, the method for measuring the rotation parameters of the spine on the medical images according to the embodiments of the present invention has been described. According to the method of the present invention, the rotation parameters of the spine can be rapidly and precisely measured on the medical images. When the method of the present invention is implemented by a software manner, said software may not only be integrated within an image diagnosing device but also run as an independent software.

Similar to the method, the present invention also provides a corresponding apparatus.

Figure 7:
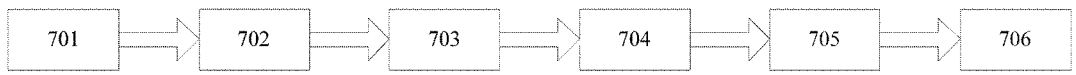
FIG. 7 is a schematic block diagram illustrating one embodiment of an apparatus for measuring rotation parameters of a spine on medical images according to the present invention.

FIG. 7 is a schematic block diagram illustrating one embodiment of an apparatus for measuring rotation parameters of a spine on medical images according to the present invention.

As shown in FIG. 7, the apparatus 700 may comprise: an image selecting module 701 for selecting a reference image and a movement image from the medical images; an upper and lower spine image selecting module 702 for determining a lower spine image and an upper spine image in the reference image and determining a lower spine image and an upper spine image in the movement image; a lower spine image registering module 703 for registering the lower spine image in the movement image with the lower spine image in the reference image; an upper spine image correcting module 704 for correcting the upper spine image in the movement image according to output parameters of registration of the lower spine images; a superposed image generating module 705 for superposing the upper spine image in the reference image with the corrected upper spine image in the movement image to obtain a superposed image; and a rotation parameter calculating module 706 for calculating to obtain the rotation parameters according to a position difference between the upper spine image in the reference image and the upper spine image in the movement image on the superposed image.

In one embodiment of the present invention, the lower spine image registration module 703 may further include: a first direction selecting module for selecting a search direction for the registration; a first rigid transform module for performing a rigid transform on the lower spine image in the movement image according to the search direction; and a first parameter outputting module for regarding a total shift amount and/or a total rotation amount during the registration of the lower spine images as the output parameters of registration of the lower spine images when a match degree between the lower spine image in the reference image and the lower spine image in the movement image after the rigid transform reaches a preset threshold.

In one embodiment of the present invention, the upper spine image correcting module 704 may further include: a module for performing the rigid transform on the upper spine image in the movement image according to the total shift amount and/or the total rotation amount.

In one embodiment of the present invention, the rotation parameter calculating module 706 may further include: an upper spine image registering module for registering the upper spine image in the reference image with the corrected upper spine image in the movement image; and a module for obtaining the rotation parameters according to the output parameters of registration of the upper spine images.

In one embodiment of the present invention, the upper spine image registering module may further include: a second direction selecting module for selecting a search direction for the registration; a second rigid transform module for performing a rigid transform on the corrected upper spine image in the movement image according to the search direction; and a second parameter outputting module for regarding a total shift amount and/or a total rotation amount during the registration of the upper spine images as the output parameters of registration of the upper spine images when a match degree between the upper spine image in the reference image and the upper spine image in the movement image after the rigid transform reaches a preset threshold.

In one embodiment of the present invention, the rotation parameter calculating module 706 may further include: a rotation angle calculating module for regarding the total rotation amount as a rotation angle in the rotation parameters.

In one embodiment of the present invention, the rotation parameter calculating module 706 may further include: a reference point selecting module for selecting at least two reference points in the movement image; a corresponding point calculating module for calculating corresponding points of the reference points in the reference image according to the output parameters of registration of the upper spine images; a perpendicular bisector calculating module for calculating perpendicular bisectors of connecting lines between the reference points and the corresponding points on the superposed image; and a rotation center calculating module for regarding an intersection point of the perpendicular bisectors as the rotation center in the rotation parameters.

So far, the apparatus for measuring the rotation parameters of the spine on the medical images according to the embodiments of the present invention has been described. Similar to the above-mentioned method, according to the apparatus of the present invention, the rotation parameters of the spine can be rapidly and precisely measured on the medical images. When the apparatus of the present invention is implemented by a software manner, said software may not only be integrated within an image diagnosing device but also run as an independent software.

The above descriptions are merely embodiments of the invention and are not intended to restrict the scope of the invention. All kinds of variations and modifications could be made to the present invention to those skilled in the art. Any modifications, alternatives and improvements made within the spirit and principles of the present invention shall all within the scope of the appended claims.

What is claimed is:

1. A method for measuring rotation parameters of a spine on medical images, comprising:
    selecting a reference image and a movement image from the medical images;
    determining a lower spine image and an upper spine image in the reference image and determining a lower spine image and a upper spine image in the movement image;
    registering the lower spine image in the movement image with the lower spine image in the reference image;
    correcting the upper spine image in the movement image according to output parameters of registration of the lower spine images;
    superposing the upper spine image in the reference image with the corrected upper spine image in the movement image to obtain a superposed image; and
    calculating to obtain the rotation parameters according to a position difference between the upper spine image in the reference image and the upper spine image in the movement image on the superposed image.

2. The method according to claim 1, wherein the step of registering the lower spine image in the movement image with the lower spine image in the reference image further comprises:
    selecting a search direction for the registration;
    performing a rigid transform on the lower spine image in the movement image according to the search direction; and
    regarding a total shift amount and/or a total rotation amount during the registration of the lower spine images as the output parameters of registration of the lower spine images when a match degree between the lower spine image in the reference image and the lower spine image in the movement image after the rigid transform reaches a preset threshold.

3. The method according to claim 2, wherein the step of correcting the upper spine image in the movement image according to output parameters of registration of the lower spine images further comprises:
    performing a rigid transform on the upper spine image in the movement image according to the total shift amount and/or the total rotation amount.

4. The method according to claim 1, wherein the step of calculating to obtain the rotation parameters according to a position difference between the upper spine image in the reference image and the upper spine image in the movement image on the superposed image further comprises:
registering the upper spine image in the reference image with the corrected upper spine image in the movement image; and
obtaining the rotation parameters according to the output parameters of registration of the upper spine images.

5. The method according to claim 4, wherein the step of registering the upper spine image in the reference image with the corrected upper spine image in the movement image further comprises:
selecting a search direction for the registration;
performing a rigid transform on the corrected upper spine image in the movement image according to the search direction; and
regarding a total shift amount and/or a total rotation amount during the registration of the upper spine images as the output parameters of registration of the upper spine images when a match degree between the upper spine image in the reference image and the upper spine image in the movement image after the rigid transform reaches a preset threshold.

6. The method according to claim 5, wherein the step of obtaining the rotation parameters according to the output parameters of registration of the upper spine images further comprises:
regarding the total rotation amount as a rotation angle in the rotation parameters.

7. The method according to claim 5, wherein the step of obtaining the rotation parameters according to the output parameters of registration of the upper spine images further comprises:
selecting at least two reference points in the movement image;
calculating corresponding points of the reference points in the reference image according to the output parameters of registration of the upper spine images;
calculating perpendicular bisectors of connecting lines between the reference points and the corresponding points on the superposed image; and
regarding an intersection point of the perpendicular bisectors as a rotation center in the rotation parameters.

8. An apparatus for measuring rotation parameters of a spine on medical images, comprising:
an image selecting module for selecting a reference image and a movement image from the medical images;
an upper and lower spine image selecting module for determining a lower spine image and an upper spine image in the reference image and determining a lower spine image and an upper spine image in the movement image;
a lower spine image registering module for registering the lower spine image in the movement image with the lower spine image in the reference image;
an upper spine image correcting module for correcting the upper spine image in the movement image according to output parameters of registration of the lower spine images;
a superposed image generating module for superposing the upper spine image in the reference image with the corrected upper spine image in the movement image to obtain a superposed image; and
a rotation parameter calculating module for calculating to obtain the rotation parameters according to a position difference between the upper spine image in the reference image and the upper spine image in the movement image on the superposed image.

9. The apparatus according to claim 8, wherein the lower spine image registration module further comprises:
a first direction selecting module for selecting a search direction for the registration;
a first rigid transform module for performing a rigid transform on the lower spine image in the movement image according to the search direction; and
a first parameter outputting module for regarding a total shift amount and/or a total rotation amount during the registration of the lower spine images as the output parameters of registration of the lower spine images when a match degree between the lower spine image in the reference image and the lower spine image in the movement image after the rigid transform reaches a preset threshold.

10. The apparatus according to claim 9, wherein the upper spine image correcting module further comprises:
a module for performing a rigid transform on the upper spine image in the movement image according to the total shift amount and/or the total rotation amount.

11. The apparatus according to claim 8, wherein the rotation parameter calculating module further comprises:
an upper spine image registering module for registering the upper spine image in the reference image with the corrected upper spine image in the movement image; and
a module for obtaining the rotation parameters according to the output parameters of registration of the upper spine images.

12. The apparatus according to claim 11, wherein the upper spine image registering module further comprises:
a second direction selecting module for selecting a search direction for the registration;
a second rigid transform module for performing a rigid transform on the corrected upper spine image in the movement image according to the search direction; and
a second parameter outputting module for regarding a total shift amount and/or a total rotation amount during the registration of the upper spine images as the output parameters of registration of the upper spine images when a match degree between the upper spine image in the reference image and the upper spine image in the movement image after the rigid transform reaches a preset threshold.

13. The apparatus according to claim 12, wherein the rotation parameter calculating module further comprises:
a rotation angle calculating module for regarding the total rotation amount as a rotation angle in the rotation parameters.

14. The apparatus according to claim 12, wherein the rotation parameter calculating module further comprises:
a reference point selecting module for selecting at least two reference points in the movement image;
a corresponding point calculating module for calculating corresponding points of the reference points in the reference image according to the output parameters of registration of the upper spine images;
a perpendicular bisector calculating module for calculating perpendicular bisectors of connecting lines between the reference points and the corresponding points on the superposed image; and
a rotation center calculating module for regarding an intersection point of the perpendicular bisectors as a rotation center in the rotation parameters.

* * * * *